Fig.1

April 25, 1950  R. R. STEVENS  2,505,260
CONTROL APPARATUS
Filed April 7, 1945  4 Sheets-Sheet 3

INVENTOR.
Roy R. Stevens
BY
ATTORNEY

April 25, 1950     R. R. STEVENS     2,505,260
CONTROL APPARATUS Filed April 7, 1945     4 Sheets-Sheet 4

INVENTOR.
Roy R. Stevens
BY
ATTORNEY

Patented Apr. 25, 1950

2,505,260

UNITED STATES PATENT OFFICE 2,505,260

CONTROL APPARATUS

Roy R. Stevens, Forest Hills, Pa., assignor to The Westinghouse Air Brake Company, Wilmerding, Pa., a corporation of Pennsylvania Application April 7, 1945, Serial No. 587,165

14 Claims. (Cl. 192—.098)

1

This invention relates to control apparatus and more particularly to apparatus for pulling casing, pipes, rods etc. from a well bore.

Mobile oil well servicing or pulling units are in use which include a drum carrying pulling or lifting cable adapted to be connected to pipes or rods in a well so that upon rotation of said drum, said pipes or rods will be lifted out of the well. Power means such as an engine is provided for turning the drum through the medium of high or low speed driving units adapted to be selectively connected to the engine by individual clutches.

One object of the invention is the provision of an operator's control apparatus for selectively controlling devices, such as the clutches just mentioned, and for also controlling the speed of the power means or driving engine.

On well servicing units of the above type it is desirable to be able to selectively engage either clutch to any desired degree up to full engagement. It is also desirable at times to fully engage one clutch and to at the same time be able to partially engage the other clutch to provide a jerk to break loose or to start lifting a pipe or rod which it is desired to lift. Further, it is desirable to be able to disengage either clutch without disengaging the other, or to disengage both clutches at the same time. Still further, it is desirable to operate the engine at any speed, regardless of the condition of the clutches, and it is particularly desirable to be able to accelerate the engine to any desired degree with either clutch partially or fully engaged, as well as during the act of affecting such engagement.

Another object of the invention is therefore the provision of an operator's control apparatus embodying a single control lever and mechanism controlled by said lever in such a manner as to provide for obtaining the selective control of a plurality of devices or operations, such as of the two clutches and speed of a power means, as above described.

Other objects and advantages will be apparent from the following more detailed description of the invention.

In the accompanying drawings.

2

Description Figs. 1 to 8

Figure 1:
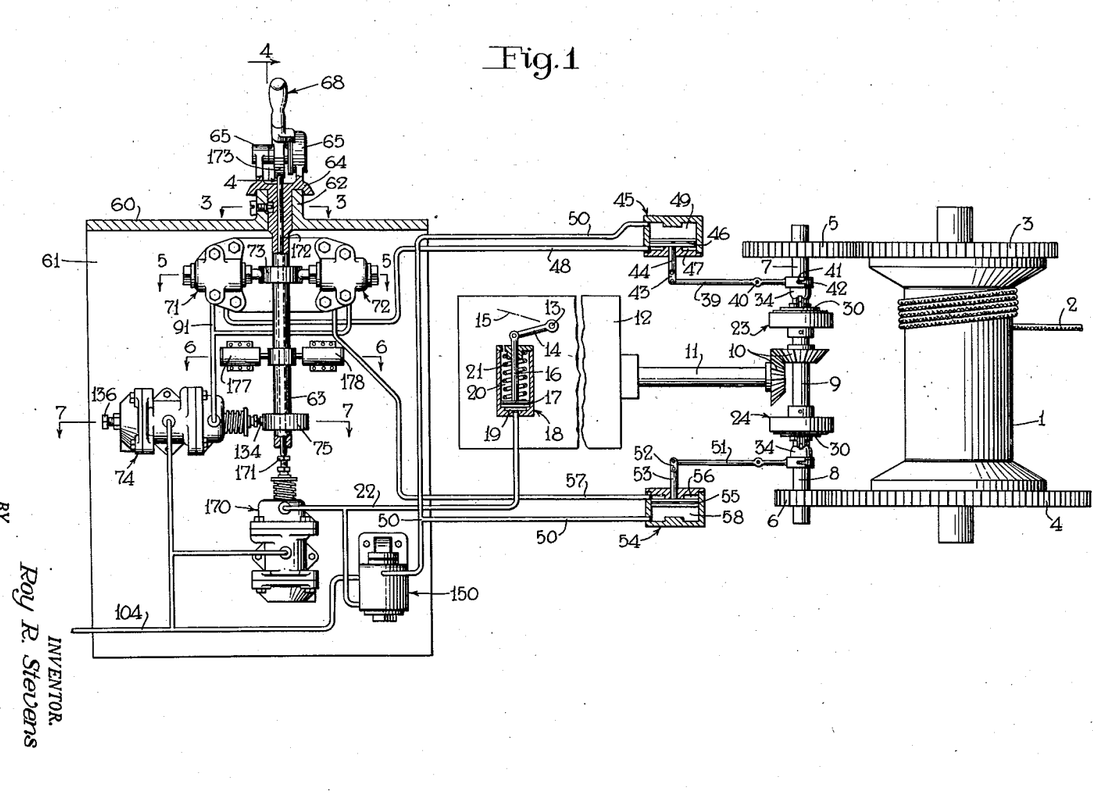
Fig. 1 is a diagrammatic sectional view of a portion of a well servicing unit embodying the invention.

As shown in the drawing the reference numeral 1 indicates a rotatable drum adapted upon rotation to wind up a lifting cable 2 for lifting a pipe, rod or the like from a well. On one end of this drum is mounted a gear 3 while on the opposite end is a larger gear 4. The gears 3 and 4 mesh respectively with gears 5 and 6 secured to turn with coaxially aligned shafts 7 and 8. Each set of gears 5, 3 and 6, 4 forms a reduction gearing, the former constituting a high speed drive connection between shaft 7 and drum 1 with respect to the drive connection between shaft 8 and drum 1, which may be termed a low speed drive connection.

Individual clutches 23 and 24 are provided for selectively connecting the shafts 7 and 8, respectively, to an intermediate shaft 9 which is operatively connected through the medium of bevel gearing 10 to a drive shaft 11. The drive shaft 11 is arranged to be driven by a power means in the form of an engine 12.

It will be apparent that when the engine 12 is operating the engagement of clutch 24 will connect said engine through the gears 6 and 4 to the drum 1 to provide a maximum degree of lifting power on the cable 2, and therefore a minimum rate of lifting speed for starting and lifting a pipe or rod from the well. With the engine 12 thus connected to the drum 1, a partial engagement of clutch 23 will provide an additional connection between the engine 12 and drum 1 to create a jerk on said drum and thereby on the lifting cable in order to break a pipe or rod loose in the well to initiate a lifting operation.

Engagement of clutch 23 when the clutch 24 is disengaged will transmit less power from the engine 12 to the lifting cable 2 but will provide for a higher rate of speed of lifting than provided through the gears 6 and 4, as will be apparent. Moreover when the clutch 23 is engaged a partial engagement of clutch 24 at the same time will provide a jerk on the cable 2 to initiate a lifting operation, as will be apparent. The speed at which the cable 2 is wound up on the drum 1 will also vary according to the speed at which engine 12 is operated, as will be obvious.

The speed of engine 12 may be controlled by rocking a shaft 13 which is adapted to control or vary the rate of supply of fuel to the engine, in any conventional manner, whereby the engine may be caused to operate at different speeds or different degrees of power output. A lever 14 is connected to the fuel control shaft 13 for adjusting said shaft. The lever 14 and shaft 13 may have an engine idling position, in which they are shown in the drawing, for supplying fuel at a rate to provide for operation of the engine at a desired low or idling speed. The lever 14 and shaft 13 may be adjustable out of idling position in a clockwise direction, as viewed in the drawing, for increasing the supply of fuel to the engine to thereby obtain an engine speed or power output proportional to the degree of such movement. The maximum speed or output of power of engine 12 may be obtained with the lever 14 in a position indicated by the dot and dash line 15.

The free end of lever 14 is operatively connected to one end of a rod 16 the opposite end of which is connected to a piston 17 of a speed adjusting device 18. The piston 17 is contained in a cylinder and is subject on one face to pressure of fluid in a pressure chamber 19. At the opposite side of piston 17 is a non-pressure chamber 20 through which the rod 16 extends and which contains a spring 21 acting on piston 17 in opposition to pressure of fluid in chamber 19. Chamber 19 is connected to a speed control pipe 22 through which fluid under pressure is adapted to be supplied to and released from said chamber by means to be hereinafter described.

The pressure of spring 21 against piston 17 is such as to hold said piston against movement out of the position in which it is shown in the drawing, when the pressure of fluid in chamber 19 is below a certain degree such as 10 pounds. When the pressure of fluid in chamber 19 is increased above the chosen degree of 10 pounds, spring 21 will yield to permit movement of piston 17, in opposition to the pressure of said spring, to a position determined by the pressure of fluid in chamber 19, to thereby correspondingly position the fuel control lever 14. When fluid at a maximum degree of pressure is provided in chamber 19 the piston 17 will move the lever 14 to the maximum engine speed position indicated by the dot and dash line 15. It will thus be apparent that when the pressure of fluid in chamber 19 does not exceed the chosen degree of 10 pounds, the engine 12 will operate at an idling speed; while upon an increase in such pressure above said chosen degree the speed of the engine will be correspondingly increased.

The two clutches 23 and 24 are identical in construction and operation and are of the type requiring force to effect engagement and which when only partially engaged will become disengaged upon dissipation of such force, but which when fully engaged will remain engaged upon dissipation of such force, and will require force to effect disengagement. The essential elements of such a clutch are shown by way of illustration only, in Fig. 2 of the drawings which is a sectional view of clutch 23.

Figure 2:
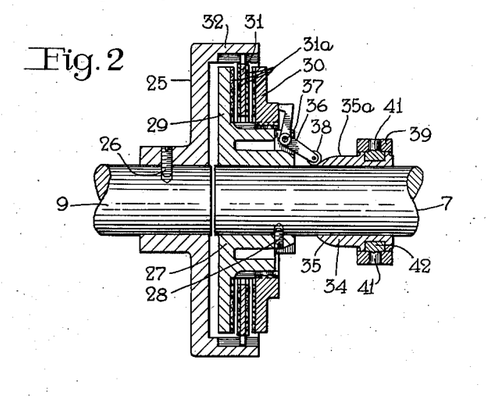
Fig. 2 is a cross sectional view of one of two like clutches shown in elevation in Fig. 1.

As shown in Fig. 2 of the drawing, the clutch 23 may comprise a driving member 25 secured to the driving shaft 9 in any suitable manner as by means of a set screw 26 to turn with the shaft and further comprises a driven member 27 secured by means of a set screw 28 to the adjacent end of shaft 7 for driving the shaft. The driven member 27 comprises an integrally formed disc 29 upon which is splined a coaxially arranged disc 30. Interposed between the two discs 29 and 30 is a disc 31 carried by and having a splined connection internally with a rim 32 projecting from the driving member 25 over the outer peripheral surfaces of discs 29 and 30. On each of the adjacent faces of discs 29, 30, and 31 there is secured a disc 31a of any conventional clutch facing material.

It will be seen that movement of the disc 30 in the direction of the disc 29 will squeeze the disc 31 between the two discs 30 and 29 and thereby create a frictional driving connection between the shafts 9 and 7, while upon relief of pressure of disc 30 on the discs 31 and 29 this driving connection will be broken. By suitable adjustment of the pressure of disc 30 against discs 31 and 29 any desired partial degree of engagement, or full engagement, of the clutch can be obtained as will be apparent.

For moving the several discs 30, 31 and 29 into engagement a sleeve 34 is slidably mounted on shaft 7 and on the end adjacent the disc 30 said sleeve is provided with a tapered actuating surface 35. A plurality of bell cranks 36 are spaced around the shaft 7, although only one of these bell cranks is seen in the section shown in Fig. 2. Each of these bell cranks is fulcrumed at its knee on a pin 37 and has one end in contact with the adjacent surface of disc 30. In the other end of bell crank 36 is mounted a roller 38 arranged for contact with surface 35 on the sleeve 34.

Movement of sleeve 34 in the direction of the friction disc 30 on shaft 7 will actuate the bell cranks 36 to move the several discs into frictional contact, the degree of force between said discs being determined by the position of the roller 38 on the sleeve operating surface 34. By properly positioning the sleeve 34 any desired degree of clutch engagement can be obtained up to full engagement under which condition the roller 38 will have left the surface 35 and will be positioned on a cylindrical surface 35a of sleeve 33. Upon full engagement of the clutch the shaft 7 will be secured to turn in unison with the shaft 9 but with any less degree of engagement the shaft 9 may turn at a faster rate than shaft 7 as will be apparent.

A lever 39 fulcrumed intermediate its ends on a pin 40 has a bifurcated end connected to pins 41 provided on opposite sides of a ring 42 which is journaled in an annular groove in the sleeve 34. The opposite end of lever 39 is connected by a link 43 to one end of a rod 44 of a clutch control motor 45. The motor 45 comprises a casing containing a piston 46 which is connected to rod 44. At one side of piston 46 is a chamber 47 connected to a clutch engaging pipe 48 while at the opposite side is a chamber 49 connected to a clutch disengaging pipe 50. Upon supply of fluid under pressure to pipe 50 and thereby to pressure chamber 49 when pipe 48 is vented, the piston 46 will move to the position in which it is shown in the drawing for thereby operating the lever 39 to draw the clutch controlling sleeve 34 to the position shown in Fig. 2 for disengaging the clutch 23. Upon supply of fluid under pressure to pipe 48, when fluid under pressure is released from pipe 50, and chamber 49, the pressure of fluid effective in chamber 47 will move the piston 46 in the direction of the opposite end of its cylinder to thereby operate lever 39 to move the clutch control sleeve 34 in the direction of the clutch discs to effect engagement of the clutch. The degree of engagement of clutch 23 may be varied according to the pressure of fluid provided through pipe 48 in pressure chamber 47, while full engagement will be obtained upon providing sufficient pressure in said chamber to move said piston into contact with the end of its cylinder opposite the end in which it is shown in the drawing.

Sleeve 34 in the clutch 24 is operatively connected by a lever 51 and a link 52 to a rod 53 projecting from a clutch control motor 54, which is identical to motor 45. The motor 54 therefore comprises a casing containing a piston 55 connected to the rod 53. At one side of piston 55 is a pressure chamber 56 which is connected to a clutch engaging pipe 57 while at the opposite side is a pressure chamber 58 which is connected to the clutch disengaging pipe 50. Upon supply of fluid under pressure to pipe 50, when fluid under pressure is released from pipe 57, the piston 55 will move to the position in which it is shown in the drawing for effecting disengagement of clutch 24, while upon supply of fluid under pressure through pipe 57 to chamber 56, when fluid under pressure is released from chamber 58 by way of pipe 50, the piston 55 will operate to engage the clutch 24. It will thus be seen that the control of the two clutches 23 and 24 is identical, a force being required to engage the clutches and to also disengage the clutches, in case they are fully engaged. It is desired to point out that with the clutches fully engaged, the engaging force, that is, the pressure of fluid in either pressure chamber 47 or 56, may be released without obtaining disengagement of the clutch due to the face that the rollers 38 will be disposed on the cylindrical portion 35a of the clutch control sleeve 33. With either clutch only partially engaged, however, under which condition the roller 38 will be disposed on the inclined surface 35, the clutch will automatically disengage upon release of the engaging force, that is to say upon the release of fluid under pressure from either chamber 47 or 56 as the case may be.

The structure so far described is employed merely for illustrating one use of the invention and a further description and more detailed showing of said structure is therefore not deemed essential in the present application.

The invention comprises operator's control means for selectively controlling the supply and release of fluid under pressure to and from the speed control pipe 22, and the clutch control pipes 48, 57 and 50 and said control means will now be described.

The operator's control means comprises a stand which may be in the form of a cabinet having a top wall 60 and a back wall 61. The top wall 60 is provided with an upstanding boss 62 through which there is provided a bore, and journaled in this bore and extending into the interior of the cabinet is a rotatable control shaft 63. The shaft 63 has an annular collar 64 resting on the upper end of the boss 62 for supporting the shaft 63, and extending upwardly from said collar are two parallel arranged arms 65 having in their ends aligned bores in which is journaled an operating shaft 66. An operator's lever 68 has one end disposed between the two arms 65 and is provided with a bore through which the shaft 66 extends. The shaft 66 and lever 68 may be connected together by a key 69 so that upon vertical movement of said lever, as viewed in the drawing, the shaft 66 will turn in the two arms 65 without turning the shaft 63. It will be apparent that through the medium of the two arms 65 and shaft 66, the operator's control lever 68 is operative to turn the control shaft 63 in the boss 62.

Mounted on the back wall 61 of the cabinet underneath the top wall 60 are two clutch selector valve devices 71 and 72 which are disposed at opposite sides of a cam 73 mounted on the control shaft 63 for rotation therewith. Below the clutch selector valve device 71 a clutch control valve device 74 is mounted on the back wall 60 at one side of a cam 75 which is also mounted on the control shaft 63 for rotation therewith.

Figure 5:
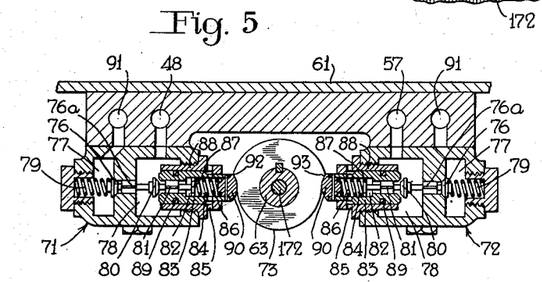
Figure 6:
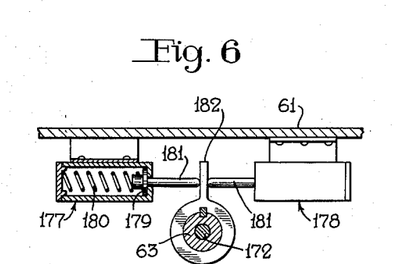

The clutch selector valve devices 71 and 72 are identical in construction and each comprises, as shown in Fig. 5 of the drawings, a fluid under pressure supply valve 76 contained in a chamber 77 and arranged to control flow of fluid under pressure from said chamber to a chamber 78. A spring 79 in chamber 77 acts on the supply valve 76 for urging it to its closed position in which it is shown in the drawing. Chamber 78 contains a release valve 80 which is arranged to seat in the same direction as the supply valve 76.

The supply valve 76 has a stem 76a extending into chamber 78 and engaging the release valve 80. Release valve 80 has a fluted stem 81 mounted to slide in a bore 82 provided in a sleeve 83, and extending from said bore into a chamber 84 in said sleeve. Chamber 84 is open to atmosphere through a port 85 and contains a spring 86 acting on a follower 87 which is in contact with the release valve stem 81, this spring being under pressure and therefore effective to urge the release valve 80 out of seating engagement with the end of sleeve 83. The sleeve 83 is mounted to slide in a bore provided through a nut 88 which is secured in the casing of the device by screw-threaded engagement. The sleeve 83 has an annular groove in which there is disposed a sealing ring 89 having sealing and sliding contact with the wall of the bore through nut 88 to prevent leakage of fluid under pressure from chamber 78 along the outer surface of said sleeve. The outer end of chamber 84 in sleeve 83 is closed by a cap 90 the outer end surface of which is rounded for contact with the peripheral surface of cam 73, it being noted that the two caps 90 of the two selector valve devices 71 and 72 engage diametrically opposite portions of said cam.

The supply valve chamber 77 in both of the selector valve devices 71 and 72 is connected to a fluid pressure supply pipe 91 leading to the clutch control valve device 74. The release valve chamber 78 in the selector valve device 71 is connected to the clutch engaging pipe 48, while in the selector valve device 72 the corresponding chamber 78 is connected to the clutch engaging pipe 57.

Figure 3:
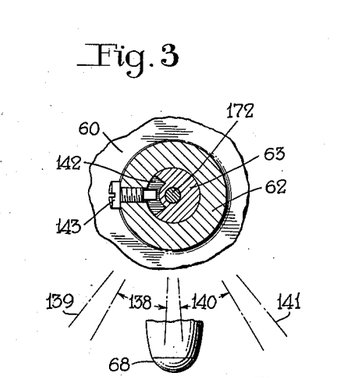
Figs. 3 to 7 are sectional views taken on lines 3—3, 4—4, 5—5, 6—6 and 7—7, respectively, in Fig. 1.

The cam 73 is so designed that with the operator's control lever 68 and cam 73 in a neutral position as shown in Figs. 1 and 3 and 5 of the drawings, the fluid pressure supply valves 76 in the two selector valve devices will be seated by their respective springs 79 while the sleeves 83 will be moved out of contact with the release valves 80 by springs 86, whereby both of the clutch control pipes 48 and 57 will be open to atmosphere. The cam 73 is provided with a shoulder or rise 92 which upon rotation of the operator's control lever 68 in a counterclockwise direction, as viewed in the drawing, will effect movement of sleeve 83 in the selector valve device 71, into contact with the release valve 80 and then actuate said valve to unseat the supply valve 76 so as to thereby close communication between chamber 78 and atmosphere by way of port 85 and open said chamber to chamber 77 so that fluid under pressure may flow from the supply pipe 91 to the clutch engaging pipe 48. When the selector valve device 71 is thus operated, the parts of the selector valve device 72 will remain in the position in which they are shown in Fig. 5 of the drawings as will be apparent.

The cam 73 is also provided with a shoulder or raised portion 93 which is like and is arranged opposite to the rise 92. This raised portion 93 is effective upon clockwise rotation of the operator's control lever 68 from neutral position to close the release valve 80 and open the supply valve 76 in the selector valve device 72 to thereby open communication between the supply pipe 91 and the clutch engaging pipe 57, the parts of the selector valve device 71 remaining in the position in which they are shown in Fig. 5 of the drawings during such operation. Return of the operator's control lever 68 to its neutral position from either direction of rotation out of its neutral position will effect operation of the selector valve device 71 or 72 to open the respected clutch engaging pipe 48 or 57 to atmosphere.

It will thus be seen that the operator by moving his control lever 68 from neutral position in a generally horizontal plane in one direction may supply fluid under pressure to the clutch engaging pipe 48 while retaining the clutch engaging pipe 57 open to atmosphere, or upon movement in the opposite direction may supply fluid under pressure to the clutch engaging pipe 57 while retaining pipe 48 open to atmosphere.

The supply of fluid under pressure to pipe 91 for supply to either one of the clutch engaging pipes 48 or 57 is arranged to be controlled by the clutch control valve device 74.

Figure 7:
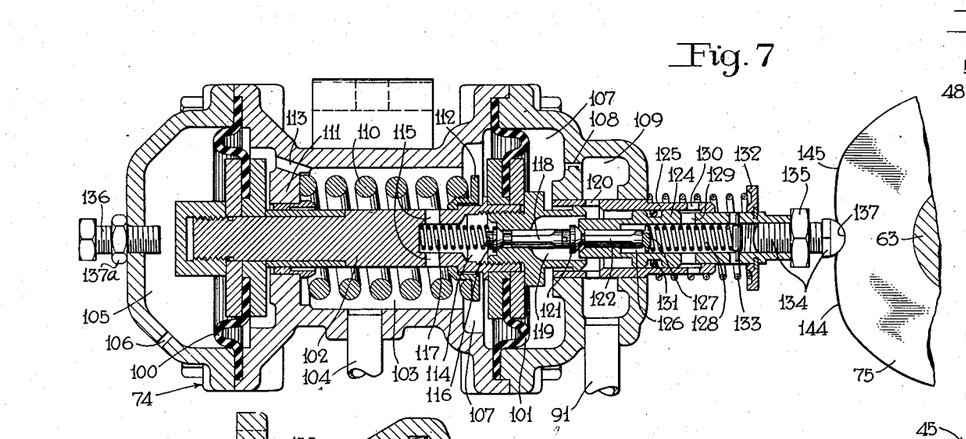

The clutch control valve device 74 as shown in detail in Fig. 7 comprises a casing containing two spaced coaxially aligned flexible diaphragms 100 and 101. These diaphragms are of the same area and at their centers are connected together for movement in unison by a rigid connecting structure 102. Between the two diaphragms 100 and 101 is a chamber 103 connected to a pipe 104 which is arranged to be constantly supplied with fluid under pressure from any suitable source. At the opposite face of diaphragm 100 is a chamber 105 which is in constant communication with atmosphere through a breather port 106. At the opposite face of diaphragm 101 is a control chamber 107 which is connected through a stabilizing choke 108 to a chamber 109. The chamber 109 is connected to pipe 91 leading to the supply valve chamber 77 in the two clutch selector valve devices 71 and 72.

A coil regulating spring 110 contained in chamber 103 and encircling the structure 102 bears at one end on a ledge 111 of the casing, while the opposite end bears against a collar 112 associated with said structure. This spring is provided to oppose movement of the diaphragms 100 and 101 and the connecting structure 102 in the direction of the left hand out of a normal position in which these parts are shown in the drawings. In this normal position the spring 110 is fully expanded. A port 113 through the ledge 111 provides for equalization of the pressure of fluid at opposite sides of said ledge, whereby the adjacent faces of the two diaphragms 100 and 101 will be constantly subjected to the same pressure of fluid.

The connecting structure 102 adjacent the diaphragm 101 has a chamber 114 open through ports 115 to chamber 103 and containing a fluid pressure supply valve 116 and a spring 117 acting on said valve for urging it to a closed position in which it is shown in the drawings. The supply valve 116 has a fluted stem 118 extending through a bore in the connecting structure 102 into a chamber 119 which is open through one or more ports 120 to chamber 109. Chamber 119 contains a release valve 121 arranged to seat in the same direction as the supply valve 116 and engaging the stem 118 of said supply valve. The release valve 121 has a stem 122 disposed to slide in a bore provided axially in a plunger 124 which is slidably mounted in a sleeve 125 secured in the casing. The release valve stem 122 projects into a chamber 126 formed within the plunger 124 and therein engages one side of a follower 127. A spring 128 in chamber 126 engages the opposite side of follower 127. This spring is under pressure and therefore constantly effective to urge the sleeve 124 in a direction away from and thus out of seating engagement with the release valve 121. Chamber 126 is in constant communication with atmosphere through one or more ports 129 in plunger 124 and one or more registering ports 130 in sleeve 125. The plunger 124 is provided with an annular groove in which there is disposed a sealing ring 131 having sealing and rolling contact with the bottom wall of said groove and the adjacent surface of sleeve 125 for preventing leakage of fluid under pressure from chamber 119 past said plunger to atmosphere.

Beyond the outer end of sleeve 125 an annular spring seat 132 is secured to the plunger 124, and interposed between this spring seat and the portion of the casing encircling the sleeve 125 is a coil bias spring 133 which is under a chosen degree of pressure and therefore constantly effective to urge said plunger in a direction out of seating engagement with the release valve 121.

The outer end of chamber 126 in the plunger 124 is closed by a follower 134 having screw-threaded engagement with said plunger. A lock nut 135 on the follower 134 is provided to engage the outer end of plunger 124 for securing said follower in an adjusted condition. The outer end of the follower 134 is arranged for contact with the peripheral surface of cam 75.

Projecting into chamber 105 and having screw-threaded engagement with the casing is a limiting screw 136 arranged for contact with the adjacent end of the diaphragm connecting structure 102 for limiting movement of said structure in the direction of the left hand. A lock nut 137a provided on the screw 136 is arranged for contact with the casing to lock said screw in an adjusted position.

The cam 75 is provided with a recess 137 which, with the operator's control lever 68 in neutral position in its horizontal plane of movement, is adapted to receive the end of the follower 134 under the action of spring 133. With the follower 134 and plunger 124 thus positioned, the parts of the control valve device will assume the position in which they are shown in Fig. 7 of the drawings, in which position the release valve 121 is opened under pressure of spring 128, the supply valve 116 is closed under pressure of spring 117, and spring 110 is fully expanded. With the release valve 121 thus open the supply pipe 91, connected to the two selector valve devices 71 and 72, will be open to atmosphere through chamber 126 in the plunger 124 and thence through ports 129 and 130.

As above mentioned, the cam 75 is shown in Fig. 7 in a position it assumes with the operator's control lever 68 in neutral position in the generally horizontal plane of movement, in which position said lever is shown in Figs. 1 and 3 of drawings. At one side of this neutral position the lever 68 has a zone of movement 138 (Fig. 3) for graduating the degree of partial engagement of clutch 24, and beyond this zone the lever 68 has a position 139 to effect full engagement of clutch 24. At the opposite side of neutral position the lever 68 has a reversely arranged zone 140 for providing different degrees of engagement of clutch 23 and beyond this zone a position 141 for effecting full engagement of clutch 23 as will hereinafter be described in greater detail.

The control shaft 63 is provided in one side with an arcuate slot 142 (Fig. 3) into which extends the end of a screw 143 secured in the boss 62 extending upwardly from the top wall 60 of the cabinet. The end of this screw is adapted to engage with the opposite ends of slot 142 for limiting movement of the operator's control lever 68 in a generally horizontal plane, and the length of said slot is such as to prevent movement of said lever past either of the positions 139 or 141, but providing for adjustment of said lever between said positions.

At one side of recess 137 the cam 75 has a peripheral surface 144 adapted upon clockwise movement of lever 68 out of its neutral position to effect displacement of follower 134 toward the left hand (Fig. 7) a degree which is proportional to the extent of such movement. A maximum degree of displacement of follower 134 will be obtained with the lever in the position 139, while the degree of such displacement obtained with said lever at the adjacent end of zone 138 will equal the space shown in Fig. 7 between the adjacent ends of the diaphragm connecting structure 102 and of the limiting screw 136. At the opposite side of recess 137 the cam 75 has a surface 145 which is identical to but arranged reversely of the surface 144 for effecting displacement of follower 134 out of its normal position upon counterclockwise movement of lever 68 from neutral position toward the position 141. In the position 141 the same maximum degree of displacement of follower 134 will be obtained as in the position 139, while at the adjacent end of zone 140 the displacement of follower 134 out of its normal position will be the same as obtained at the opposite end of the zone 138.

The operation of the clutch control valve device 74 is as follows:

With the operator's control lever 68 in neutral position permitting follower 134 to enter recess 137 in the cam 75, the release valve 121 is opened so as to connect the pipe 91 to atmosphere as above described. An initial relatively small degree of movement of lever 68 in either direction out of neutral position is adapted to effect operation of cam 75 to displace follower 134 in the direction of the left hand (Fig. 7) against the opposing pressure of spring 133 to a degree sufficient for moving plunger 124 into seating engagement with the release valve 121 and, if desired, for then actuating said release valve to unseat to a slight degree the fluid pressure supply valve 116 from its seat on the diaphragm connecting structure 102.

Let it be assumed that the operator's control lever 68 is moved from neutral position to some position within the zone 138 in order to effect displacement of follower 134 and thereby of the supply valve 116 in the direction of the left hand (Fig. 7) to a position corresponding to that of said lever. With the supply valve 116 thus opened fluid under pressure will flow from chamber 103 between the two diaphragms 100 and 101 past said valve to chamber 119 and thence to chamber 109 and pipe 91. As fluid under pressure is thus supplied to pipe 91 it will also flow from chamber 109 through choke 108 to chamber 107 and therein act on the diaphragm 101 in opposition to spring 110.

When the pressure of fluid thus obtained in chamber 107 is increased to a degree sufficient to overcome spring 110, the diaphragm 101 will deflect against said spring relative to the supply valve 116 which will be held against movement due to the expansive force of spring 117. Fluid under pressure will however, continue to flow to pipe 91 and thus to chamber 107 until the diaphragm 101 deflects the diaphragm connecting structure 102 into seating engagement with supply valve 116 which will then prevent further flow of fluid under pressure to said pipe. The pressure of fluid obtained in pipe 91 will therefore be limited to a degree corresponding to the displacement of the supply valve 116 from its normal position in which it is shown in Fig. 7 and hence corresponding to the position of lever 68 in zone 138.

If the operator now desires to increase the pressure of fluid in pipe 91 he will move the lever 68 in a clockwise direction (Fig. 3) further into the zone 138 and this movement will again open the supply valve 116. Fluid under pressure will then flow past the supply valve 116 to pipe 91 and at the same time through choke 108 to diaphragm chamber 107 and, as the pressure of fluid in said chamber increases, the diaphragm 101 will be deflected further against spring 110 and finally move the diaphragm connecting structure 102 into seating engagement with the supply valve 116 when the pressure of fluid in said pipe is increased to a degree corresponding to the position of said valve and therefore the position of the operator's control lever 68 in zone 138.

If the operator moves the control lever 68 to the end of zone 138 adjacent position 139 the supply valve 116 will be so positioned as to be engaged by the diaphragm structure 102 in a position of such structure in which it will substantially engage the adjusting screw 136. Thus in this position of lever 68 a maximum degree of regulated pressure will be obtained in pipe 91. If the lever 68 is moved to the position 139 to effect further unseating of the supply valve 116 the pressure of fluid from pipe 104 will equalize into pipe 91, since the adjusting screw 136 will prevent movement of the diaphragm connecting structure 102 such as required to close the supply valve 116, as will be apparent.

Now assuming that the operator's control lever has been positioned in the zone 138 for providing a chosen degree of pressure in pipe 91 and the operator desires to reduce this pressure to a somewhat lower degree, he will move lever 68 back in the direction of neutral position. Upon such movement of lever 138 spring 133 acting on plunger 124 will move said plunger in the direction of cam 75 as permitted by the cam surface 144 and, as a result, said plunger will move out of contact with the release valve 121 since spring 128 will hold said valve against movement with said plunger. Fluid under pressure will then be released from pipe 91 past the release valve 121 and thence to atmosphere, and at the same time the pressure of fluid in diaphragm chamber 107 will correspondingly reduce. As the pressure in chamber 107 is thus reduced, spring 110 will move the diaphragms and their connecting structure 102 and thus the seated supply 116 and the release valve 121 in the direction of the plunger 124 and finally seat the release valve against the end of said plunger, when the pressure of fluid in chamber 107 and pipe 91 becomes reduced to a degree corresponding to the new position of the operator's control lever. Another adjustment of the operator's control lever in the direction of neutral position, but still in the control zone 138, will effect another and corresponding reduction in the pressure of fluid in pipe 91, as will be readily apparent. If the operator's control lever is returned to the neutral position the plunger 124 will be so conditioned by spring 133 that the release valve 121 will remain open upon complete release of fluid under pressure from pipe 91 and chamber 107, as will be readily apparent from the above description.

It will now be seen that the operator by adjustment of lever 68 out of neutral position in a clockwise direction, as viewed in Fig. 3, may cause the clutch control valve device 74 to provide any desired degree of pressure in pipe 91 between atmospheric pressure, obtained in the neutral position of said lever, and a maximum degree of pressure obtained in the position 139 of said lever.

If the operator's control lever 68 is moved in a counterclockwise direction from its neutral position either into zone 140 or to position 141, as viewed in Fig. 3, the clutch control valve device 74 will be operated by the cam surface 145 to provide the same different pressures of fluid in pipe 91 as provided in corresponding positions of said lever in zone 138 or in position 139 as will be readily apparent.

It will now be seen that if the operator moves the control lever 68 out of neutral position in a counterclockwise direction, as viewed in Fig. 3, the selector valve device 71 will be operated to connect the clutch control pipe 48 to pipe 91 and the clutch control valve device 74 will be operated to supply fluid through said pipes to the clutch control motor 45 at a pressure determined by the position of said lever for thereby actuating said motor to engage clutch 23. The clutch 23 may be thus engaged to any degree less than full engagement by proper adjustment of lever 68 in the control zone 140, and if said lever is moved from said zone back to its neutral position, the consequent release of fluid under pressure from the clutch control motor 45 to atmosphere by way of pipe 48 and through the selector valve device 71 will permit disengagement of clutch 23. However if the lever 68 is moved to the position 141 a maximum pressure of fluid will be provided by the clutch control valve device 74 through pipe 48 to the clutch control motor 45 to thereby effect full engagement of clutch 23. If the clutch 23 is thus fully engaged it will then remain engaged when the operator's control lever 68 is moved back to neutral position for effecting a complete release of fluid under pressure from the clutch control motor 45 by way of pipe 48 and the selector valve device 71.

When the operator's lever 68 is operated as just described pipe 57 leading to the clutch control motor 54 will be maintained open to atmosphere through the selector valve device 72 so that clutch 24 will remain disengaged. However, if the operator moves his lever in a clockwise direction as viewed in Fig. 3, into the zone 138 he will effect operation of the selector valve device 72 to establish communication between the clutch control pipe 57 and pipe 91 so as to thereby supply fluid under pressure from the clutch control valve device 74 to the clutch control motor 54 to effect engagement of clutch 24. The degree of engagement of clutch 24 may be varied according to the position of the operator's lever 68 in zone 138 and if only partially engaged the clutch may be disengaged upon movement of said lever out of said zone back to the neutral position. However, movement of lever 68 to position 139 will effect full engagement of clutch 24, as a result of which, said clutch will remain engaged upon complete release of fluid under pressure from pipe 57. When the lever 68 is operated as just described to effect engagement of the clutch 24 the selector valve device 71 remains in the condition opening pipe 41 from the clutch control motor 44 to atmosphere.

A clutch release valve device 150 is provided for supplying fluid under pressure to pipe 50 and thereby to the two clutch control motors 45 and 54 for effecting disengagement of the clutches 23 and 24 after said clutches have been fully engaged.

Figure 8:
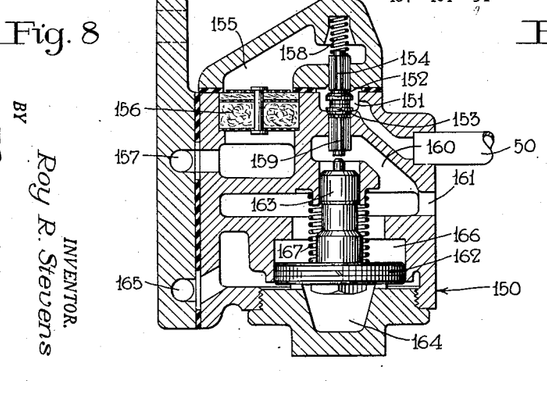
Fig. 8 is a longitudinal sectional view of a valve device shown in Fig. 1 in side elevation.

As shown in Fig. 8, the clutch release valve device 150 comprises a casing having a chamber 151 open to pipe 50 and containing two oppositely seating poppet valves 152 and 153. The valve 152 has a fluted stem 154 extending through a bore provided in a wall which separates chamber 151 from a chamber 155. Chamber 155 is connected through an air cleaner 156 to a passage 157 leading to the fluid pressure supply pipe 104. A spring 158 in chamber 155 acts on the valve stem 154 for unseating the valve 152 and for seating the valve 153. The valve 153 has a fluted stem 159 extending through a bore in a wall which separates chamber 151 from a chamber 160 which is open to atmosphere through a passage 161. The casing further contains a piston 162 having an operating stem 163 extending into chamber 160 in coaxial relation with the valve stem 159. At one side of piston 162 is a pressure chamber 164 which is open to a passage 165 connected to the speed control pipe 22. At the opposite side of piston 162 is a chamber 166 through which the piston stem 153 extends and which is open to atmosphere through passage 161. A control spring 167 contained in chamber 166 and encircling the piston stem 163 is supported at one end on the casing while the opposite end bears against piston 162.

The pressure of spring 167 against piston 162 is such as to require fluid at a pressure such as 10 pounds in chamber 164 to move the piston against the opposing force thereof. The piston 162 when it is thus moved is adapted to act through stem 163, which will move into contact with the valve stem 159, to open the valve 153 and to close the valve 152, for thereby opening the clutch release pipe 50 to atmosphere by way of passage 161. When the pressure of fluid in chamber 164 is less than 10 pounds, spring 167 will maintain piston 162 in the position in which it is shown in the drawing so that spring 158 will open valve 152 and close valve 153 to thereby supply fluid under pressure from pipe 104 to pipe 50 for operating the clutch control motors 45 and/or 54 to effect disengagement of the respective clutches 23 and 24.

Secured to the back wall 61 of the control cabinet directly under the lower end of the operating shaft 63 is a speed control valve device 170 which is identical in construction and in operation to the clutch control valve device 74, with the exception, that it does not include a limiting screw, such as 136 associated with the clutch control valve device 74. It is therefore sufficient to point out that the speed control valve device 170 comprises a follower 171 corresponding to follower 134 of the clutch control valve device 74, and which is operable upon displacement into the device to vary the pressure of fluid in pipe 22 according to the degree of such displacement, or according to its position with respect to its normal position in which it is shown in Fig. 1 and in which the speed control pipe 22 will be open to atmosphere, whereby any desired pressure may be attained in the speed regulating device 18 to cause a corresponding adjustment in speed of engine 12.

For controlling the displacement of follower 171 of the speed control valve device 170 said follower is engaged by one end of a rod 172 which extends through an axial bore provided from end to end through the control shaft 63. The opposite end of rod 172 terminates between the two arms 65 at the upper end of the control shaft 63 and between such arms operatively engages with the peripheral surface of a cam 173 provided on the operator's control handle 68.

Figure 4:
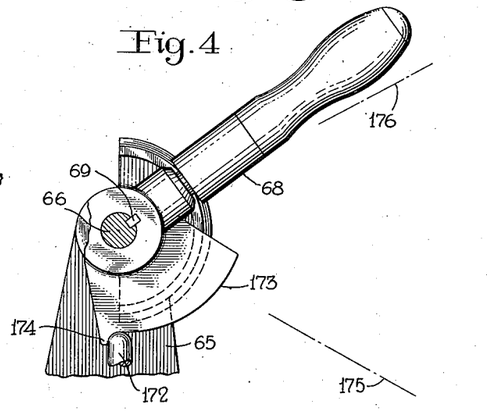

In the most elevated position of the operator's control lever 68, in which position said lever is shown in Fig. 4 of the drawings, the cam 173 permits movement of the rod 172 in an upward direction to permit follower 171 of the speed control valve device 170 to move to its uppermost position for opening speed control pipe 22 to atmosphere. A shoulder 174 on cam 173 engages one side of the rod 172 in this uppermost position of the operator's control lever 68 to define said position and to prevent further upward movement of said lever. The cam 173 is so formed that upon downward movement of lever 68 the rod 172 and thereby the plunger 171 of the speed control valve device 170 will be moved in the direction of said device in accordance with the extent of such downward movement, the maximum downward movement being obtained when the lever is in the position indicated by the dot and dash line 175 (Fig. 4). It will thus be seen that by proper adjustment of the operator's control lever between its normal position and its maximum pressure position indicated by the dot and dash line 175, any desired degree of pressure may be provided in the speed control pipe 22 between atmospheric pressure and a maximum degree.

In a position of control lever 68 indicated by a dot and dash line 176 the speed control valve device 170 is adapted to be conditioned to provide in pipe 22 a chosen degree of pressure such as 10 pounds. It will be noted that this pressure effective in piston chamber 164 of the clutch release valve device 150 is that required to move piston 162 against the opposing force of spring 167, and it is also the pressure required to initiate movement of piston 17 in the speed adjusting device 18 out of its engine idling position against the opposing force of spring 21. It will therefore be seen that with the operator's control lever in its normal position, as well as in all positions between normal position and the position indicated by the dot and dash line 176 in Fig. 4 of the drawings, the engine 12 will be caused to operate at idling speed, and the clutch release valve device 150 will be conditioned to supply fluid under pressure to pipe 50 to effect operation of the clutch control motors 45 and 54 to effect disengagement of clutches 23 and 24, while upon adjustment of said lever out of the position indicated by the dot and dash line 176 to any position between said line and the dot and dash line 175, fluid will be supplied to pipe 22 at a pressure which will effect operation of the clutch release valve device 150 to open pipe 50 to atmosphere and at the same time will cause operation of the speed adjusting device 18 to accelerate the engine 12 to a degree corresponding to the position of said lever.

Secured to the back wall 61 of the cabinet are two oppositely arranged resistance or centering devices 177 and 178 which are provided for opposing manual movement of the operator's control lever 68 in either direction from its neutral position in a generally horizontal plane and which are automatically operative upon release of manual force on said lever to return said lever to its neutral position. These two spring devices are identical, each comprising a casing containing a plunger head 179 subject to pressure of a spring 180 and having a rod 181 urged by said spring in a direction for engaging a finger 182 projecting from the operating shaft 63. The two rods 181 are of such length as to permit contact between the respective plunger heads 179 and the casing with said rods engaging opposite sides of the shaft centering finger 182 when the control lever 68 is in neutral position. Movement of lever 68 out of neutral position in a clockwise direction is opposed by spring 180 in the resistance device 178, while upon removal of manual force from said lever said spring will automatically return said lever and the control shaft 63 to their neutral positions. The resistance device 177 is effective in the same manner in case the operator's control lever is moved out of its neutral position in a counter-clockwise direction.

*Operation Figs. 1 to 8*

In operation, let it be initially assumed that the operator's control lever 68 is in its neutral position Figs. 1 and 3 with respect to its horizontal plane of movement, and in its uppermost position (Fig. 4) with respect to its vertical plane of movement. With the lever 68 in its neutral position the selector valve devices 71 and 72 are both conditioned to open the respective clutch engaging pipes 48 and 57 to atmosphere; the clutch control valve device 74 is conditioned to open pipe 91 to atmosphere; while the speed control valve device 170 is conditioned to open the speed control pipe 22 to atmosphere. With the speed control pipe 22 open to atmosphere, the clutch release valve device 150 is conditioned, as shown in Fig. 8 of the drawings, to supply fluid under pressure to pipe 50 through which pipe the fluid thus supplied will flow to the clutch control motors 45 and 54 to effect operation thereof to disengage both clutches 23 and 24.

Now let it be assumed that the operator desires to engage clutch 24 to initiate a lifting operation, and to at the same time maintain clutch 23 disengaged. To accomplish this he will move his control lever 68 out of its uppermost position shown in Fig. 4 in a downward direction to at least the position indicated by the dot and dash line 176, or if he so desires he may move it beyond this position to thereby effect operation of the speed control valve device 170 to supply fluid under pressure to pipe 22 at a pressure in excess of 10 pounds, to thereby cause a corresponding degree of acceleration of engine 12. The pressure of fluid thus provided in pipe 22 will effect operation of the clutch release valve device 150 to open the clutch disengaging pipe 50 to atmosphere, so as to release fluid under pressure from chambers 49 and 58 in, respectively, the clutch control motors 45 and 54.

At the same time as the operator moves lever 68 downwardly to at least the position indicated by dot and dash line 176, he will also move it out of neutral position in a clockwise direction (Fig. 3) to thereby effect operation of the selector valve device 72 to connect pipe 57 to pipe 91 and to also effect operation of the clutch control valve device 74 to supply fluid under pressure through said pipes to the clutch control motor 54 to effect operation of said motor to engage clutch 24. The operator may thus effect any desired degree of partial engagement of clutch 24 or full engagement thereof, depending upon the position to which he moves his lever as hereinbefore described.

At the same time as the operator moves the lever 68 to effect engagement of clutch 24, or after such engagement has been effected, he may adjust the lever 68 downwardly in a vertical direction from the dot and dash line 176, to a selected position to effect operation of the speed control valve device 17 to accelerate engine 12 to a desired degree, whereby a lifting operation at a desired speed will be effected through the medium of cable 2. In case the clutch 24 is less than fully engaged and the operator desires to effect disengagement thereof he may return lever 68 to neutral position for thereby releasing fluid under pressure from pipe 57, whereupon the clutch 24 will fully disengage. In case the clutch 24 has been fully engaged however, and the operator desires to disengage it, he must return lever 68 not only to its neutral position for opening pipe 57 to atmosphere, but he must also permit movement of said lever in an upward direction to at least the position indicated by the dot and dash line 176 for thereby reducing the pressure in the speed control pipe 22 and the clutch release valve device 150 to a degree sufficient to permit opening of valve 152 in said device, whereupon fluid under pressure will be supplied to pipe 50 for actuating the motor 54 to effect disengagement of clutch 24.

In the same manner as just described, the operator, by moving his lever 68 in a downward direction and in a counterclockwise direction out of neutral position, may effect engagement of clutch 23, either partially or fully, while retaining clutch 24 disengaged, and at the same time he may accelerate engine 12 to any desired degree for thereby effecting a lifting operation through the medium of cable 2. Upon return of lever 68 to its neutral position disengagement of clutch 23 will occur in case said clutch is not fully engaged. In case the clutch 23 has been fully engaged however, the operator must return lever 68 not only to neutral position but also in a vertical direction to at least the position indicated by line 176 to thereby effect operation of the clutch release valve device 150 to supply fluid to pipe 59 for operating the clutch control motor 45 to disengage clutch 23.

It will thus be seen that the operator has selective control over each of the clutches 23 and 24 and may selectively effect engagement of either of said clutches to any desired degree up to full engagement and may effect disengagement of said clutches when desired, and may also cause operation of the engine 12 at any desired speed either after the clutches have been engaged or during the process of engagement, as desired.

Now let it be assumed that the operator has actuated lever 68 to effect full engagement of clutch 24 and he desires to at the same time effect engagement of clutch 23 to provide a jerk on the lifting cable 22. To accomplish this he will move lever 68 from the left hand side of its neutral position to the right hand side, maintaining said lever depressed to at least the position indicated by the line 176 or any position below said line. This operation of lever 68 will effect a release of fluid under pressure from pipe 57, but maintaining the lever depressed as just mentioned will maintain sufficient pressure in pipe 22 to prevent operation of the clutch release valve device 150 to supply fluid under pressure to pipe 50, whereby the clutch control motor 54 will not be operated, and the clutch 24 will remain engaged. Movement of lever 68 from the left hand side of its neutral position to the right hand side as just mentioned will however, effect operation of the selector valve device 71 and of the clutch control valve device 74 to supply fluid under pressure to the clutch motor 45 to thereby effect operation of said motor to engage the clutch 23. Thus, with the clutch 24 fully engaged, the clutch 23 may be also engaged to provide the desired jerk on the lifting cable 2, and at the same time, by proper adjustment of the lever 68 in its vertical plane of movement, the engine 12 may be caused to operate at any selected speed.

When clutch 24 is fully engaged and the operator operates lever 68 to at the same time engage clutch 23, it is intended that the degree of engagement of the latter clutch will be limited to only partial engagement, so that returning lever 68 from the right hand side of neutral position to neutral position will effect disengagement of clutch 23, while retaining clutch 24 engaged. With the latter clutch still engaged the engine may then be operated at any desired speed according to the vertical position of lever 68, in order to continue the lifting operation as desired.

When it is desired to discontinue the lifting operation just described the lever 68 need only be returned vertically to its normal position shown in Fig. 4 due to which the clutch release valve device 150 will operate to supply fluid under pressure to pipe 50 to thereby effect operation of motor 54 to disengage clutch 24, and the speed of the engine will also reduce to idling, as will be apparent.

On the other hand, if clutch 23 is engaged, the operator by proper manipulation of lever 68, may at the same time cause partial engagement of clutch 24 and subsequent disengagement of said clutch, and also cause the engine to operate at any selected speed, as will be readily apparent from the above description.

It will now be seen that either clutch 23 or 24 may be engaged to any desired degree while retaining the other disengaged, or both clutches may be engaged at the same time. Either clutch may be disengaged while the other is disengaged, or if both are engaged at the same time, both may be disengaged, according to the will of the operator. This control of the clutches is obtained by movement of lever 68 merely to one side or the other of neutral position, or in an upward direction to at least line 176 to obtain disengagement of a fully engaged clutch.

It will be further noted that acceleration of the engine 12 is controlled by movement of lever 68 in a downward direction from the line 176 and that the control of engine speed is therefore separate from clutch control, with one exception, whereby the clutches may be engaged and disengaged from a partial degree of engagement with the engine operating at any desired speed. The only exception is that, to disengage a fully applied clutch, the lever 68 must be moved to a position which will reduce the engine speed to idling. With the clutches either engaged or disengaged, the speed of the engine may be adjusted to any desired degree. It will be noted that by movement of the lever diagonally from neutral position either clutch may be engaged and the engine may be accelerated to any desired degree during such engagement. By suitable manipulation of the single control lever 68, the operator may then obtain any desired control of engine speed and of the clutches necessary to provide a most difficult operation of the lifting apparatus.

Figure 9:
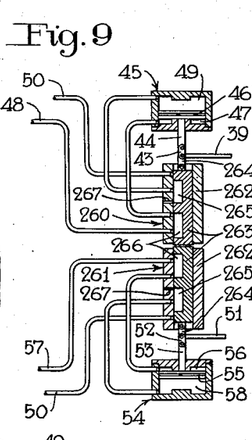
Figs. 9 and 10 are diagrammatic views similar to a portion of Fig. 1 but embodying modifications of the invention.

Description Fig. 9

After the operator has moved the control lever 68 to either position 139 or 141 (Fig. 3) to effect full engagement of clutch 24 or clutch 23, respectively, as above described, it is intended that he will move or will permit movement of said lever by either resistance device 177 or 178 back to its neutral position for releasing fluid under pressure from chamber 56 of the clutch control motor 54 or from chamber 47 of the clutch control motor 45 and then by vertical adjustment of said lever regulate the engine speed for controlling the lifting operation. By moving lever 68 back to neutral position as just mentioned he will release fluid under pressure from chamber 47 or chamber 56, depending upon which clutch is engaged, and thereby relieve the clutch parts 41, 42, 34, 36 etc. of force, which is unnecessary with the clutch fully engaged, in order to minimize wear of said parts.

With clutch 23 fully engaged and the pressure of fluid relieved in chamber 47 as just described, if the operator should for any reason again move lever 68 to position 141 he will again supply flu'd under pressure to said chamber but will accomplish nothing by such operation since the piston 46 is already in its outer clutch engaging position. However, such resupply of fluid under pressure to chamber 47 is undesirable in that it represents a useless waste of fluid under pressure. This same waste of compressed air will also occur if, when clutch 24 is fully engaged the operator should move lever 68 from neutral position back to position 139 as will be apparent.

In addition to the above, it will be noted that whenever the lever 68 is operated to effect engagement of either clutch, it is moved downwardly to at least the position 176 (Fig. 4) so as to release fluid under pressure from the clutch disengaging pipe 50. This release of fluid under pressure from pipe 50 and thereby from chamber 49 or 58 is essential in the respective motor 45 or 54 which is going to be operated to effect engagement of the selected clutch 23 or 24, but is unnecessary in the other motor as will be readily apparent. Moreover this release of fluid under pressure from chamber 49 or 58 in the motor for the clutch which will remain disengaged is undesirable since when fluid under pressure is subsequently resupplied to the one of said chambers required to effect disengagement of the engaged clutch, the other one of said chambers has to be refilled with fluid under pressure. In other words, when lever 68 is operated to engage, for instance, clutch 23 and is then operated to subsequently disengage said clutch, a needless release and then resupply of fluid under pressure from and to chamber 58 in the motor for clutch 24 takes place. The same needless release and resupply of fluid under pressure from and to chamber 49 will occur when, with clutch 23 disengaged, clutch 24 is engaged and disengaged. No harm or undesired result in so far as operation of the structure is concerned comes from this needless release and subsequent supply of fluid under pressure from or to chamber 49 or chamber 58, but it does cause an unnecessary waste of compressed air.

If it is desired, the waste of compressed air under the conditions above set forth may be avoided by the structure shown in Fig. 9 of the drawings.

According to this modification I associated with the clutch control motor 45 an intercepting valve device 260 which is arranged to control communication between control pipes 48 and 50 and the respective motor chamber 47 and 49, while a like valve device 261 is associated with the clutch control motor 54 for controlling communication between the control pipes 57 and 50 and the respective motor chamber 56 and 58.

Each of the intercepting valve devices 260 and 261, may, for illustrative purposes only, comprise a casing 262 having a bore in which there is slidably mounted a piston like slide valve 263. The slide valve 263 is operatively connected to one end of a link 264. In the intercepting valve device 260 the opposite end of link 264 is operatively connected to the piston rod link 43 so that the respective slide valve 263 is movable with and by piston 46. In the intercepting valve device 261, the opposite end of link 264 is similarly operatively connected to link 52 for movement with and by piston 55 in motor 54.

The slide valve 263 has two cavities 265 and 266, and the casing 262 has a relatively small port 267 open to atmosphere and adapted to be connected to cavity 265 when the respective piston 46 or 55 is in its clutch disengaging position, and adapted to be connected to cavity 266 when said piston is in its outermost or clutch engaging position.

In motor 45, when piston 46 is in its inner or clutch disengaging position the cavity 266 in the intercepting valve device 260 opens communication through pipe 48 to piston chamber 47, while piston chamber 49 is open to cavity 265 and thus to the atmosphere by way of port 267, and pipe 50 is lapped by the respective slide valve 263. The same conditions exist in the intercepting valve device 261 when piston 55 of motor 54 is in its inner or clutch disengaging position. It will be noted that both piston chambers 49 and 58 are at this time open to atmosphere and disconnected from pipe 50 which at this time may be supplied with fluid under pressure.

Now assuming that it is desired to engage clutch 23 the operator actuates lever 68 in the same manner as before described to release fluid under pressure from pipe 50 and to supply fluid under pressure to pipe 48. Fluid under pressure thus supplied to pipe 48 will then flow through cavity 266 in the intercepting valve device 260 to piston chamber 47 and therein act to move the piston 46 in an upward direction to cause the clutch 23 to engage. The cavity 266 is of such a length as to maintain open the communication between pipe 48 and piston chamber 49 for movement of piston 46 required to effect any desired partial degree of engagement of clutch 23 so that if the operator desires to disengage said clutch he may do so merely by releasing fluid under pressure from pipe 48. However, if the operator moves lever 68 to position 141 to effect full engagement of clutch 23, the cavity 266 in slide valve 263 of the intercepting valve device 260 will move out of registry with pipe 48 and into registry with port 267 just before piston 46 attains its uppermost position, the end of pipe 48 being lapped by said slide valve in this position. It will thus be seen that after the piston 46 attains its clutch full engaging position the actuating fluid pressure in chamber 47 will be released to atmosphere which will automatically relieve the clutch parts of the actuating force, and this release is restricted by the small size of port 267 in order to maintain a sufficient pressure in chamber 47 on piston 46, after the supply of fluid under pressure to said chamber is cut off by slide valve 263, to ensure movement of piston 46 to its uppermost clutch engaging position.

After the clutch 23 has been engaged, the operator may move his lever back to neutral position, particularly due to the automatic return tendency of centering device 177, and thereby open pipe 48 to atmosphere. With clutch 23 fully engaged if the operator should then for any reason move lever 68 back into zone 140 or to position 141 and cause a resupply of fluid under pressure to pipe 48, the chamber 47 in motor 45 will not be needlessly recharged with fluid under pressure since the communication between said pipe and chamber is closed by the respective slide valve 263. An unnecessary use or waste of fluid under pressure can not therefore result from such unnecessary operation of lever 68.

In the clutch engaging position of piston 46 it will also be noted that chamber 49 will be connected to pipe 50 through cavity 265 in the respective slide valve 263, so that when the operator desires to disengage clutch 23 he may do so by operating lever 68 to supply fluid under pressure to pipe 50 and thence to said chamber. Upon such supply of fluid under pressure to chamber 49, the piston 46 will be moved in the direction of its inner or disengaging position, the cavity 265 in the respective slide valve being of such length as to maintain the supply of fluid under pressure from pipe 50 to chamber 49 until just before said position is attained, at which time said cavity will move out of registry with pipe 50 and into registry with the release port 267. The restricting effect of release port 267 will then maintain sufficient pressure in chamber 49 to ensure movement of the piston 46 to its disengaged position, following which said pressure will be fully dissipated through said port to relieve the clutch parts of force therefrom.

When the clutch 23 is operated as just described, the slide valve 263 in the intercepting valve device 261 will maintain closed the communication between pipe 50 and chamber 58 in motor 54, so that there can be no waste of fluid under pressure by releasing and subsequently supplying fluid under pressure to chamber 58, as hereinafter described.

If, when clutch 23 is disengaged, the operator actuates lever 68 to engage and subsequently disengage clutch 24, the intercepting valve device 261 will operate to automatically disconnect piston chamber 56 from pipe 57 when the piston 55 attains its clutch fully engaged position in order to relieve said chamber of pressure of fluid to thus relieve the parts of clutch 24 of actuating force, and also to prevent waste of fluid under pressure by flow to chamber 56 in case the operator, after releasing fluid under pressure from pipe 57, should subsequently operate lever 68 to resupply fluid under pressure to said pipe. Further, with clutch 23 disengaged and piston chamber 49 disconnected from pipe 50, a waste of fluid under pressure can not occur by flow to said chamber upon supply of fluid under pressure to pipe 50 to effect disengagement of clutch 24, as will be evident from the above description.

General remark Figs. 1 to 9

From the above description it will be noted that when either clutch 23 or 24 is fully engaged, the operator, by moving lever 68 to, respectively, position 139 or position 141, may at the same time effect full engagement of the other clutch, but it is not intended that the operator will ever cause full engagement of both clutches at the same time. It will thus be seen that it is left to the judgment of the operator to limit the degree of engagement of one clutch to less than full engagement when the other clutch is fully engaged, and operators are fully capable of so controlling the apparatus. If desired however, the engagement of both clutches 23 and 24 at the same time can be prevented by a structure such as shown in Fig. 10 of the drawings, or when one clutch is fully engaged the engagement of the other can be limited to a degree less than full engagement by either one of the structures shown in Figs. 11, 13, or 14.

Figure 10:
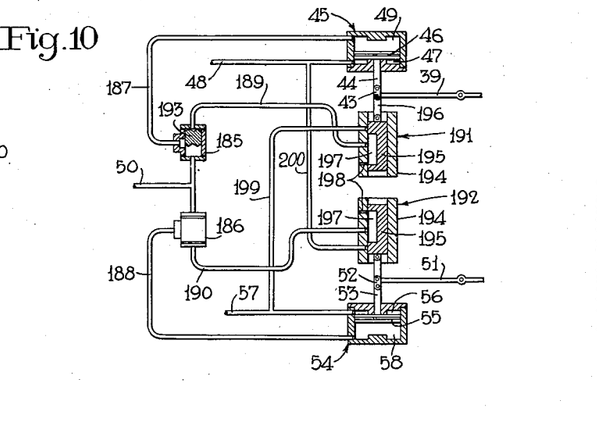

Description Fig. 10

According to this modification the clutch disengaging pipe 50 is disconnected from chambers 49 and 58 in the two respective clutch control motors 45 and 54 and connected to one end of two double check valve devices 185 and 186. The side outlet of the double check valve device 185 is connected by a pipe 187 to piston chamber 49 in the clutch control motor 45, while the side outlet of the double check valve device 186 is connected by a pipe 188 to piston chamber 58 in the clutch control motor 54. The opposite end outlets of the double check valve devices 185 and 186 are connected to pipes 189 and 190 respectively. The pipes 189 and 190 lead to two interlock valve devices 191 and 192 which are arranged for control by pistons 46 and 55 in the clutch control motors 45 and 54 respectively.

The two double check valve devices 185 and 186 are identical in structure and operation, each comprising a double check valve 193, shown only in the device 185, for controlling communication between the three pipes connected to the device. In the double check valve device 185 the double check valve 193 is operative upon supply of fluid under pressure to pipe 50, when fluid under pressure is released from pipe 189, to open communication between pipe 50 and pipe 187 and to close communication between pipe 187 and 189, while upon supply of fluid to pipe 189 when fluid under pressure is released from pipe 50, the double check valve 193 is operative to close communication between pipe 187 and pipe 50, and to open pipe 187 to pipe 189. The double check valve device 186 is operative in the same manner as the double check valve device 185 to control communication between pipes 50, 188 and 190.

The interlock valve devices 191 and 192 may be identical and of any conventional structure, each comprising for the purpose of illustration, a casing 194 having a bore in which there is slidably mounted a piston like valve 195. In the interlock slide valve device 191, the slide valve 195 is connected by a link 196 to the clutch control lever 39 at its connection to piston 46 in the clutch control motor 45, while in the interlock valve device 192, the slide valve 195 is similarly connected to piston 55 in the clutch control motor 52. Each of the slide valves 195 has a cavity 197 which, with the piston 46 or 55 in the disengaged position shown in the drawings, connects pipe 189 or 190 to a relatively restricted passage 198 which is open to atmosphere. When the clutch control piston 46 or 55 moves to its outer position for effecting engagement of the respective clutch the slide valve 195 in the respective interlock valve device 191 or 192 is operated to break communication between pipe 189 or pipe 190 and the respective atmospheric passage 198 and to connect said pipe to pipe 199 or pipe 200 respectively. Pipes 199 and 200 lead respectively to pipes 57 and 48.

In operation, let it be assumed that lever 68 has been operated to supply fluid under pressure to pipe 57 and thence to chamber 56 in the clutch control motor 54 to effect engagement of clutch 24, and that said lever has also been depressed to below the line 176 for causing operation of the engine at or above idling speed, under which condition pipe 50 will be open to atmosphere, as well as pipe 187 and 188 by way of pipe 59, for reasons which will be evident from the following description. With piston 55 in the clutch control motor 54 in its lower position effecting full engagement of clutch 24 it will be noted that slide valve 195 in the interlock valve device 192 will be so positioned as to break communication between pipe 190 and the atmospheric exhaust port 198 and to connect said pipe by way of cavity 197 to pipe 200 leading to pipe 48.

Now let it be assumed that with clutch 24 fully engaged and with the control lever 68 depressed to or below the line 176 the operator actuates said lever to effect a supply of fluid under pressure to pipe 48 to cause engagement of clutch 23. This operation of lever 68 will also actuate the selector valve device 72 to release fluid under pressure from pipe 57 and thereby from chamber 56 in the clutch control motor 54, but this will have no effect upon clutch 24 in its fully engaged position.

Fluid under pressure supplied to pipe 48 to effect engagement of clutch 23 as just described will flow from said pipe through pipe 200, cavity 197 in the interlock valve device 192 to pipe 190, and with fluid released from pipe 59 at this time due to lever 68 being depressed to or below line 176, fluid under pressure will flow from pipe 190 through the double check valve device 185 to pipe 188 and thence to piston chamber 58 in the clutch control motor 54. Since chamber 56 in the clutch control motor 54 is at this time vented to atmosphere as above mentioned, the pressure of fluid thus provided in chamber 58 will operate the piston 55 to effect disengagement of clutch 24. It will thus be seen that with the clutch 24 fully engaged the operator cannot engage clutch 23 without effecting disengagement of clutch 24, therefore both clutches cannot at the same time be engaged.

When piston 55 in the clutch control motor 54 moves from its clutch engaging position to its upper or disengaging position to effect disengagement of clutch 24, it will shift the slide valve 195 in the interlock valve device 192 from the position connecting pipes 200 and 190 to the position in which this communication is closed and pipe 190 is open to atmosphere through the restricted exhaust port 198. The port 198 is restricted as just mentioned so as to retain a sufficient pressure of fluid in chamber 58 after cutting off the supply of fluid pressure thereto from pipe 200 to insure full movement of piston 55 to its clutch disengaging position, following which said pressure gradually will be dissipated to the atmosphere, so that the clutch control motor 54 will be in condition to operate in case the operator subsequently supplies fluid under pressure to pipe 57 for effecting engagement of clutch 24.

If clutch 23 is fully engaged and the operator actuates lever 68 to effect engagement of clutch 24, the structure will operate to effect disengagement of clutch 23 in a manner which will be obvious from the above description, in order to prevent both clutches being engaged at the same time.

Figure 11:
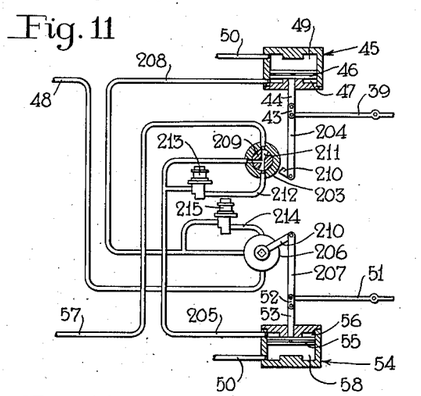
Figs. 11, 13 and 14 are views similar to Figs. 9 and 10 but embodying other modifications of the invention.

Description Fig. 11

According to this modification I associate with the clutch control motor 45 an interlock valve device 203 arranged for operation by piston 46 in said motor through the medium of a connecting link 204 to control communication between pipe 57 and a pipe 205 leading to chamber 56 in the clutch control motor 54. A like interlock valve device 206 is associated with the clutch control motor 54 for adjustment by piston 55 therein through the medium of a connecting link 207 to control communication between pipe 48 and a pipe 208 leading to piston chamber 47 in the clutch control motor 45.

The interlock valve device 203 comprises, for the purpose of illustration, a rotary plug valve 209 which is connected by a lever 210 to the link 204, whereby said plug valve will be moved to two different positions corresponding to the disengaged and fully engaged positions of piston 46 in the motor 45. The plug valve 209 has a passageway 211 which with the piston 46 in its clutch disengaging position, in which it is shown in the drawings, establishes communication between pipe 57 and pipe 205. When the piston 46 is moved to its clutch engaging position upon supply of fluid under pressure to chamber 47 the plug valve 209 will be moved to a position to close communication between pipe 57 and pipe 205. Pipe 57 however, is constantly open through passageway 211 in valve 209 to a pipe 212 which is connected through a pressure limiting valve device 213 to pipe 205.

The interlock valve device 206 is arranged to control communication between pipes 48 and 208 and a third pipe 214 in the same manner as the interlock valve device 203 controls communication between the pipes connected thereto. Thus with piston 55 in the fluid motor 54 in its clutch disengaging position, in which it is shown in the drawings, pipe 48 will be open to pipe 208, while in the clutch engaging position of said piston this communication will be closed but pipe 48 will remain connected to pipe 214. Pipe 214 is connected through a pressure limiting valve device 215 to pipe 208.

The pressure limiting valve devices 213 and 215 may be of any suitable type adapted to limit the pressure of fluid delivered thereby to a chosen degree below the pressure of fluid supplied thereto. In the present instance these limiting valve devices are adapted to limit the pressure of fluid at their outlets i. e., to pipes 205 and 208, for supply to chambers 47 and 56 in the fluid clutch control motors to such a degree as to prevent operation of piston 46 or 55 to effect full engagement of the respective clutch 23 or 24.

Figure 12:
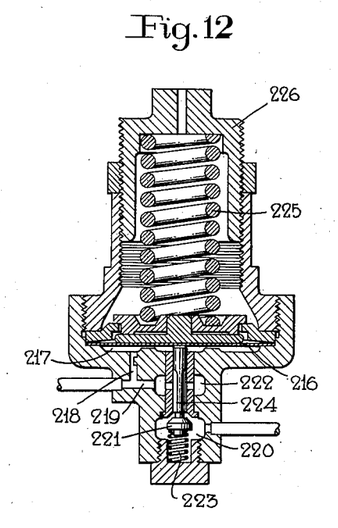
Fig. 12 is a longitudinal sectional view of a pressure limiting valve device shown in Fig. 11 in side elevation.

The pressure limiting valve devices 213 and 215 may be constructed as shown in Fig. 12, and therefore comprises a casing containing a flexible diaphragm 216 having at one side a chamber 217 which is open through a port 218 and a passage 219 to an outlet pipe which may be either pipe 205 or 208 shown in Fig. 11. The casing has a chamber 220 adapted to be constantly open to either pipe 212 or 214 and containing a valve 221 arranged to control flow of fluid under pressure from said chamber to a chamber 222 which is open to the outlet pipe through passage 219. A spring 223 in chamber 220 acts on the valve 221 for urging it to a closed position. The valve 221 has a fluted stem 224 extending into chamber 217 where it engages one side of the diaphragm 216. Bearing against the opposite side of diaphragm 216 is one end of a coil spring 225. The opposite end of spring 225 engages an adjusting nut 226 having screw-threaded engagement with the casing whereby the pressure of said spring on the diaphragm 216 may be regulated.

The operation of the limiting valve device 213 and 215 is as follows:

When fluid under pressure is supplied to pipe 212 or pipe 214 and thence to chamber 220 in the respective pressure limiting valve device 213 or 215, said pressure will equalize past the normally open valve 221 into chamber 222 and thence through passage 219 into chamber 217 below the diaphragm, and also into the outlet pipe, which may be either pipe 205 or pipe 208. When the pressure of fluid thus obtained in the outlet pipe and acting in chamber 217 below diaphragm 216 is increased to a degree sufficient to overcome the opposing adjusted force of spring 225 the diaphragm will deflect against the opposing force of said spring and permit closing of valve 221 by spring 223 for thereby limiting the pressure in passage 218 and in the outlet pipe to a degree predetermined by the adjusted force of spring 225.

The operation of the apparatus shown in Fig. 11 is as follows:

Let it be initially assumed that both of the clutches 23 and 24 are disengaged and pistons 46 and 55 in the clutch control motors 45 and 54, respectively, are in their disengaged position, as shown in the drawing. Now let it be assumed that the operator actuates the control lever 68 to effect a supply of fluid under pressure to pipe 57 for causing engagement of clutch 24. The fluid pressure thus supplied to pipe 57 will flow through passage 211 in the interlock valve device 203 to pipe 205 and thence to piston chamber 56 in the clutch motor 54. The piston 55 in this motor will then operate to effect engagement of clutch 24, as will be apparent from preceding description. With clutch 24 thus fully engaged the interlock valve device 206 will be operated to close communication between pipe 48 and pipe 208 while maintaining open the communication between pipe 48 and pipe 214.

With clutch 24 thus fully engaged let it now be assumed that the operator desires to also engage clutch 23 in order to obtain a desired jerk on the lifting cable 2. To accomplish this he will move his lever 68 as required to supply fluid under pressure to pipe 48. Fluid thus supplied to pipe 48 will then flow through the interlock valve device 206 to pipe 214 and thence through the limiting valve device 215 to pipe 208 leading to chamber 47 below the piston 46 in the clutch control motor 45. The piston 46 will then operate to effect engagement of clutch 23 to a partial degree as limited by the reduced pressure of fluid attained in pipe 208 through the limiting valve device 215. Thus while clutch 24 is fully engaged the clutch 23 may also be engaged but the limiting valve device 215 will limit the degree of engagement of the latter clutch to less than full engagement.

If clutch 23 is fully engaged, the clutch 24 may also be engaged but only to a partial degree on account of the pressure limiting action of the limiting valve device 213 as will be clear from the above description.

Figure 13:
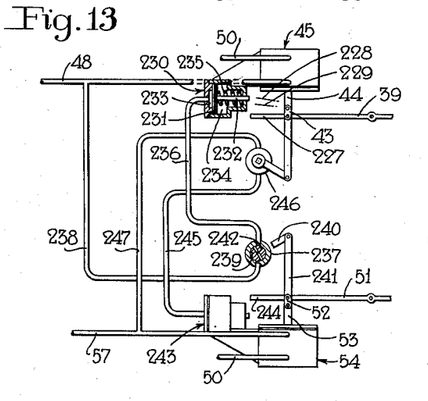

Description Fig. 13

According to this modification of the invention I associate with each of the clutches or clutch motors means operable upon full engagement of either one of the clutches to limit the degree of movement of the clutch engaging lever 39 or 51 for the other clutch to less than required to effect full engagement of said other clutch.

To illustrate this embodiment I provide an extension 227 on lever 39, and by lines 228 and 229 I have indicated the positions which said lever extension will occupy with clutch 23 fully engaged and engaged to the chosen maximum partial degree, respectively.

A pneumatic blocking device 230 is associated with the casing of the clutch control motor 45. The device 230 comprises a casing containing a piston 231 and a rod 232 arranged to be moved by said piston into the path of movement of extension 227 of the clutch control lever 39 to prevent movement of said lever past the partially engaged position indicated by the line 229. At one side of piston 231 is a pressure chamber 233 for receiving fluid under pressure to actuate said piston to move rod 232 into the path of movement of extension 227 for the purpose just described, while at the opposite side of said piston is a non-pressure chamber 234 containing a spring 235 which is operative when fluid is released from chamber 233 to actuate said piston to move rod 232 out of the path of movement of the extension 227 of the clutch control lever 39. The pressure chamber 233 is connected by a pipe 236 to an interlock valve device 237 to which is also connected a pipe 238 arranged to receive fluid under pressure from any suitable source of fluid under pressure such as pipe 56 as will be later brought out.

The interlock valve device 237 may comprise a casing containing a plug valve 239 arranged to be turned to two different positions by a lever 240 connected by a link 241 to the clutch control lever 51 for operation by the piston in the clutch control motor 54. The plug valve 239 has a passage 242 which, with the motor 54 in the condition fully engaging clutch 24, establishes communication between pipes 236 and 238, while upon disengagement of said clutch by operation of said motor the plug valve will be turned by lever 240 and link 241 to a position in which this communication is closed.

Associated with motor 54 is a pneumatic blocking device 243 which is identical to and which is arranged to cooperate with an extension 244 of the clutch control lever 51 in the same manner as the blocking device 230 cooperates with extension 227 of lever 39, as above described. The blocking device 243 is connected to a pipe 245 leading to an interlock valve device 246 to which is also connected a pipe 247 arranged to receive fluid under pressure from any suitable source of fluid under pressure such as the clutch control pipe 57. The interlock valve device 246 is identical to the interlock valve device 237 and is arranged to be controlled by motor 45 in the same manner as device 237 is controlled by the clutch control motor 54.

In operation, let it be assumed that the operator desires to effect engagement of clutch 24 and to accomplish this end supplies fluid under pressure to pipe 57, to effect operation of motor 54 to engage said clutch. This operation of motor 54 will also turn the plug valve 239 in the interlock valve device 237 to the position in which passage 242 therein establishes communication between pipes 235 and 236.

With clutch 24 fully engaged let it now be assumed that the operator desires to engage clutch 23. To accomplish this he will supply fluid under pressure to pipe 48 to effect operation of motor 45, but at the same time fluid supplied to said pipe will also flow through pipe 238, the interlock valve device 237 and pipe 236 to the blocking device 230 and actuate piston 231 therein to move rod 232 outwardly into the path of movement of the extension 227 of the clutch control lever 39. The blocking device 230 is so designed as to operate in the manner just described before any appreciable operation of motor 45 takes place, so that when said motor operates to engage clutch 23, the degree of movement of the clutch lever 39 will be limited by contact between the extension 227 of said lever and the piston rod 232. Thus with the clutch 24 fully engaged, the degree of engagement of clutch 23 will be limited to a chosen degree less than full engagement.

If clutch 23 is fully engaged, the interlock valve device 246 will be conditioned to open communication between pipes 247 and 245, so that, if the operator desires to also effect engagement of clutch 24, the blocking device 243 will be conditioned for engagement by the lever extension 244 so as to limit the degree of engagement of clutch 24, as will be evident from the above description.

It will thus be seen that with the structure just described both clutches can be engaged at will, but when either one is engaged to its full degree the degree of engagement of the other will be limited to less than full engagement. It will be further evident, that when either clutch is fully engaged and the other is then partially engaged, said other clutch may be disengaged at will merely by returning the lever 68 to its neutral position.

Figure 14:
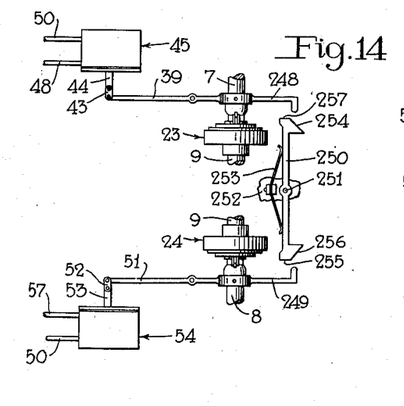
Figure 15:
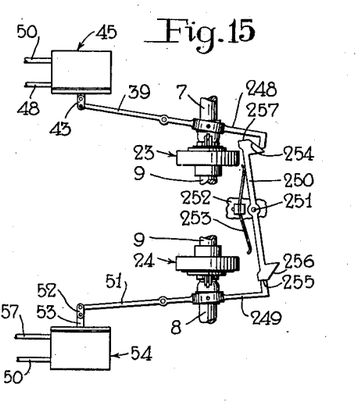
Fig. 15 is a view similar to that in Fig. 14 but showing certain parts in a different position.

*Description Figs. 14 and 15*

According to this modification there is provided mechanical blocking means, in contrast to the pneumatic blocking devices shown in Fig. 13 and above described, which is operative upon full engagement of either clutch to limit the degree of engagement of the other clutch to a chosen partial degree of engagement.

To illustrate this modification the clutch operating levers 39 and 51 are provided with extensions 248 and 249 at the opposite side of the driven shafts 7 and 8, respectively. Disposed between the ends of these extensions is a member 250 which is pivoted at its center on a pin 251 carried by any suitable fixed part 252 of the service rig. A leaf centering spring 253 carried at its center by the part 252 bears at opposite sides of pivot pin 251 on the member for causing said member to assume what may be considered a normal position in which it is shown in Fig. 14. At one end the member 250 is provided with a sloping surface 254 arranged for contact by extension 248 of the clutch lever 39. Upon operation of lever 39 to effect full engagement of clutch 23 the end of the extension 248 will slide on the sloping surface 254 to displace or rock the member 250 in a counterclockwise direction, as viewed in Fig. 14 to a position in which a surface 255 provided on the opposite end of said member is in the path of movement of the extension 249 of the clutch control lever 51 so as to thereby limit the degree of movement of the latter lever by the motor 54 to less than required to effect full engagement of clutch 24. The position which member 250 will assume upon operation of fluid motor 45 to effect full engagement of clutch 23, and the manner in which said member limits the degree of operation of the motor 54 and thereby the degree of engagement of clutch 24 under this condition, are illustrated in Fig. 15 of the drawing.

The member 250 has at the end opposite that provided with sloping surface 254 a reversely arranged sloping surface 256 arranged for contact by the extension 249 of the clutch control lever 51 upon operation of motor 54 to effect engagement of clutch 24 for rocking the member 250 in a clockwise direction to thereby move a surface 257 on the opposite end of said member into the path of movement of extension 248 of the clutch lever 39 for limiting operation of the last named lever by motor 45 to a degree less than required to obtain full engagement of clutch 23. Thus with clutch 24 fully engaged the clutch 23 can be engaged only to a partial degree.

*Summary*

From the above description it will now be seen that the improved control apparatus provides for selective control of two clutches and of the speed of an engine in such a manner that the engine may be accelerated either before or after engagement of the clutches or during the process of engagement of the clutches, as may be desired, since the control of engine speed is controlled by movement of the operator's control lever which is different from that which controls the engagement and disengagement of the clutches. By the improved structure both clutches may be engaged at the same time or if desired, means may be employed for preventing full engagement of either clutch when the other clutch is fully engaged or for even preventing engagement of both clutches at the same time. All of these various combinations of control of two clutches and of the speed of the power means are controlled by relatively simple control structure embodying a single operator's control lever which is operable to control clutch engagement independently of engine speed and to adjust the engine speed independently of the condition of the clutches. The control apparatus thus provides in a very simple manner a positive and easy control of drum 1 for operating the lifting cable 2.

Having now described my invention, what I claim as new and desire to secure by Letters Patent, is:

1. An apparatus for controlling the speed of a power means and the engagement of a clutch for transmitting power from said power means comprising in combination, speed control means operable to effect the acceleration of said power means, clutch control means operable to effect the engagement of said clutch, a control member rotatable for effecting the operation of one of said control means, another control member movable longitudinally of the rotatable member for effecting the operation of the other of said control means, and an actuating control element carried by the rotatable control member and operable to impart rotary movement to said rotatable control member and longitudinal movement to said other control member either individually or in unison.

2. In combination, two control pipes, two individual valve means one for controlling pressure of fluid in one of said pipes and the other for controlling pressure of fluid in the other of said pipes, said one valve means comprising fluid pressure controlling structure and a displaceable element for controlling said structure, said element having a normal position and being operable therein to effect operation of said structure to open the respective pipe to atmosphere, said element being adjustable out of said normal position to effect operation of said structure to supply fluid to the respective pipe at a pressure corresponding to the extent of such adjustment, said other valve means also comprising fluid pressure controlling structure and a displaceable element for controlling the structure, said displaceable element in said other valve means having a normal position and being operable therein to effect operation of the respective fluid pressure controlling structure to open the respective pipe to atmosphere and being operable upon displacement out of the normal position to effect operation of the respective fluid pressure controlling structure to supply fluid under pressure to the respective pipe, an operator's control lever having a normal position, structure carrying said lever effective to provide for movement of said lever from its normal position either in one direction or in a second direction or in a third direction, a first mechanism controlled by said lever for controlling the first named displaceable element and operative with said lever in its normal position to effect movement of said first displaceable element to its normal position and operable upon movement of said lever out of its normal position in said one direction to effect movement of said first displaceable element out of its normal position to an extent corresponding to the extent of movement of said lever, a second mechanism controlled by said lever for controlling the second named displaceable element and operative with said lever in its normal position to effect movement of said second displaceable element to its normal position and operable upon movement of said lever out of its normal position in said second direction to effect movement of said second displaceable element out of its normal position, said lever being operable upon movement out of its normal position in said third direction to effect operation of said first mechanism and of said second mechanism simultaneously to simultaneously displace the respective displaceable elements from their normal positions.

3. A control apparatus for controlling selectively the supply and release of fluid under pressure to and from each of three control pipes comprising in combination, individual valve means for controlling the supply and release of fluid under pressure to and from each of said pipes, an operator's control lever, structure carrying said lever providing for movement of said lever out of its normal position in either one direction, a second direction or in a third direction, a first mechanism controlled by said lever for controlling one of said valve means and operable with said lever in said normal position and upon movement of said lever in said second direction to effect operation of said one valve means to open the respective pipe to atmosphere and operable upon movement of said lever out of said normal position in said one direction to effect operation of said one valve means to supply fluid under pressure to the respective pipe, a second mechanism controlled by said lever for controlling a second one of said valve means and operable with said lever in its normal position and upon movement thereof in said one direction to effect operation of said second valve means to open the respective pipe to atmosphere and operable upon movement of said lever out of its normal position in said second direction to effect operation of said second valve means to supply fluid under pressure to said second pipe, said lever being operable upon movement out of said normal position in said third direction to effect simultaneous operation of said first mechanism and of said second mechanism and thereby of said first valve means and of said second valve means to supply fluid under pressure to said first and second pipes simultaneously, said third valve means being controlled by pressure of fluid in said second pipe and being operable by pressure of fluid supplied thereto to release fluid under pressure from said third pipe and being operable upon release of fluid under pressure from said second pipe to supply fluid under pressure to said third pipe.

4. A control apparatus for controlling the supply and release of fluid under pressure to and from five control pipes comprising a first valve means operable to control the supply and release of fluid under pressure to one of said pipes, a second valve means operable to control the supply and release of fluid under pressure to and from a second one of said pipes, a third valve means operable to control the supply and release of fluid under pressure to and from a third one of said pipes, and a fourth valve means operable to supply and release fluid under pressure to and from the other two of said pipes simultaneously, said fourth valve means comprising fluid pressure responsive means controlled by pressure of fluid in said third pipe and operable when the pressure in said third pipe exceeds a chosen degree to open said other two pipes to atmosphere and when less than said chosen degree to supply fluid under pressure to said other two pipes, an operator's control lever, structure carrying said lever providing for movement of said lever in a horizontal plane in either one direction or in the opposite direction from a neutral position and also providing for movement of said lever out of said horizontal plane in a vertical direction, mechanism controlled by said lever and operable upon movement thereof in said one direction to effect operation of said one valve means to effect a supply of fluid under pressure to said one pipe and operable upon movement of said lever in said opposite direction to effect operation of said second valve means to effect a supply of fluid under pressure to said second pipe, said second and one valve means comprising means operable to effect operation thereof to open the respective pipes to atmosphere upon movement of said lever in, respectively, said one and opposite directions and with said lever in a vertical plane including said neutral position, and mechanism controlled by said lever for controlling said third valve means and operable with said lever in said horizontal plane to effect operation of said third valve means to open said third pipe to atmosphere and operable upon movement of said lever out of said horizontal plane in a vertical direction to effect operation of said third valve means to supply fluid to said third pipe at a pressure corresponding to the extent of such movement.

5. A control device comprising a housing having a top wall, a shaft extending through and carried by and journaled in said wall, said shaft having an axial bore, a plunger slidably mounted in said bore, a pin arranged transversely of and carried by the end of said shaft extending above said wall, an operator's control lever journaled on said pin, said lever being operable upon movement in a direction circumferentially of said shaft to operate said pin to turn said shaft, said lever being also rockable on said pin in a direction longitudinally of said shaft, cam means associated with said lever and operable upon rocking of said lever on said pin to displace said plunger in and relative to said shaft, a structure in said housing controlled by displacement of said plunger, another structure in said housing, and cam means on said shaft within said housing operable upon rotation of said shaft to control said other structure.

6. A control apparatus comprising in combination, two fluid motors each comprising a casing, a movable power member in said casing subject on one side to pressure of fluid in a first chamber and subject on the opposite side to pressure of fluid in a second chamber and being movable to one position upon supply of fluid under pressure to said first chamber when fluid is released from said second chamber and being movable to a second position upon supply of fluid under pressure to said second chamber when fluid under pressure is released from said first chamber, a first control pipe arranged to convey fluid under pressure to said first chamber in one of said motors, a second control pipe arranged to convey fluid under pressure to said first chamber in the other motor, a third control pipe arranged to convey fluid under pressure to said second chamber in both of said motors simultaneously, control means selectively operable to supply fluid under pressure to either said first pipe and at the same time open said second and third pipes to atmosphere, or to said second pipe and at the same time open said first and third pipes to atmosphere, said control means being also operable to open said first and second pipes to atmosphere and at the same time to supply fluid under pressure to said third pipe, and valve means arranged to be operated by fluid under pressure effective in said first chamber in either one of said motors to close communication between said second chamber in the other motor and said third pipe and to supply fluid under pressure to the last named chamber.

7. A control apparatus comprising in combination, two fluid motors each comprising a casing, a movable power member in said casing subject on one side to pressure of fluid in a first chamber and subject on the opposite side to pressure of fluid in a second chamber and being movable to one position upon supply of fluid under pressure to said first chamber when fluid is released from said second chamber and being movable to a second position upon supply of fluid under pressure to said second chamber when fluid under pressure is released from said first chamber, a first control pipe arranged to convey fluid under pressure to said first chamber in one of said motors, a second control pipe arranged to convey fluid under pressure to said first chamber in the other motor, a third control pipe arranged to convey fluid under pressure to said second chamber in both of said motors simultaneously, control means selectively operable to supply fluid under pressure to either said first pipe and at the same time open said second and third pipes to atmosphere, or to said second pipe and at the same time open said first and third pipes to atmosphere, said control means being also operable to open said first and second pipes to atmosphere and at the same time to supply fluid under pressure to said third pipe, a first valve means arranged to be operated by fluid under pressure from said first pipe to disconnect said second chamber in said second motor from said third pipe and to open the last named chamber to said first pipe, a second valve means arranged to be operated by fluid under pressure from said second pipe to disconnect said second chamber in said first motor from said third pipe and to open the last named chamber to said second pipe, valve structure controlled by said power member in said second motor controlling communication between said first pipe and first valve means and arranged to close said communication with said power member in said first motor in said one position and to open said communication in said second position, and other valve structure controlled by said power member in said first motor controlling communication between said second pipe and said second valve means and arranged to close the last named communication with the power member in said first motor in its one position and to open the last named communication with the power member in said first motor in its second position.

8. An apparatus for selectively controlling operation of either one of two devices to effect either one or another of two different operations comprising in combination, a first motor arranged to control one of said devices, a second motor arranged to control the other of said devices, operator's control means comprising a lever and mechanism selectively responsive to different operations of said lever to effect operation of either one of said motors and thereby of the respective device to effect said one operation thereof, and interlock mechanism operable by each motor upon operation thereof to effect said one operation of the respective device, to effect operation of the other motor and of the respective device to effect said other operation.

9. In combination, two separate movable members each having a normal position and a certain degree of movement out of said normal position, two motors, one for each of said members, and each motor being operable to move the respective members to its normal position and out of its normal position, mechanism controlled by and rendered effective upon movement of one of said members out of its normal position to limit the extent of movement of the other member out of its normal position to a degree less than said certain degree, said mechanism being rendered ineffective with said one member in its normal position, and operator's control means selectively operable to effect operation of either one of said motors to move the respective member either to or out of its normal position, or to effect operation of both of said motors in sequence to effect movement of first one and then the other of said members out of its normal positions.

10. In combination, two separate movable members each having a normal position and a certain degree of movement out of said normal position, two motors, one for each of said members, and each motor being operable to move the respective member to its normal position or out of its normal position a movable element movable into the path of movement of one of said members for engagement by the last named member in a position adapted to limit the extent of movement of said last named member out of normal position to a degree less than said certain degree, means operable, upon operation of the motor for the other member to effect movement of said other member out of its normal position, to effect movement of said element into the path of movement of said one member, means operable to shift said element out of the path of movement of said one member upon operation of the last named motor to effect adjustment of said other member to its normal position, and control means operable to selectively effect operation of either one of said motors to move the respective member out of and back to its normal position or to effect in sequence, operation first of said other motor and then of the motor for said one member to move the respective members out of their normal position.

11. In combination, two separate control members each having a normal position and a certain degree of movement out of said normal position, two fluid motors, one for each of said members, and each motor being operable upon supply of fluid under pressure thereto to adjust the respective member out of said normal position, a device associated with one of said motors and operable by fluid under pressure to limit the movement of the said member controlled by said one motor out of said normal position to an extent less than said certain degree, means operable to render said device ineffective upon release of fluid under pressure therefrom, and valve means operably by the other motor with the respective member out of its normal position to establish a communication for supplying fluid under pressure to said device, and with the respective member in its normal position to release fluid under pressure from said device.

12. In combination, two separate control members each having a normal position and a certain degree of adjustment out of said normal position, two fluid motors, one for each of said members, and each motor being operable upon supply of fluid thereto to adjust the respective member out of its normal position to an extent corresponding to the pressure of such fluid, and to a maximum extent upon supply of fluid at a certain maximum pressure to the motor, operator's control means selectively operable to supply fluid under pressure to either one of said motors, pressure limiting means associated with one of said motors operable to limit pressure of fluid supplied thereto by said control means to a degree less than said maximum pressure, and mechanism operable by the other motor upon movement thereof by fluid under pressure supplied by said operator's control means to render said pressure limiting means effective, and operable by said other motor with the respective control member in normal position to render said pressure limiting means ineffective.

13. In combination, two clutches, two clutch control devices, one for each of said clutches, and each being operable by disengaging force to disengage the respective clutch, and also operable by engaging force to engage the respective clutch to a degree dependent upon the degree of such force, an operator's control device selectively operable to provide any desired degree, up to a maximum degree, of engaging force on either one of said control devices or on both of said control devices in sequence, and mechanism conditionable by one of said clutch control devices, when operated by clutch engaging force, to limit the degree of engaging force providable on the other clutch control device to a degree less than said maximum, said mechanism being rendered ineffective by the respective clutch control device when operated by clutch disengaging force.

14. In combination, two separate control members each having a certain range of adjustment from a normal position, two fluid motors, one for adjusting each of said members, first and second control pipes connected to each motor, each motor being operable upon supply of fluid to the respective first pipe when fluid under pressure released from the respective second pipe, to adjust the respective member out of normal position to a degree corresponding to the pressure of fluid in said respective first pipe, and each motor being operable upon release of fluid under pressure from the respective first pipe and supply of fluid under pressure to the respective second pipe to adjust the respective member to its normal position, control means operable to selectively supply fluid under pressure to either one of the two first pipes and at the same time to release fluid under pressure from the other first pipe and from both of the second pipes, and also operable to release fluid under pressure from both of said first pipes and at the same time to supply fluid under pressure to both of said second pipes, and mechanism associated with each motor and rendered effective with the respective motor operated in response to pressure of fluid supplied to the respective first pipe to limit operation of the other motor to adjust the respective member to an extent less than its full range upon supply of fluid under pressure to the respective first pipe.

ROY R. STEVENS.

REFERENCES CITED

The following references are of record in the file of this patent:

UNITED STATES PATENTS

| Number | Name | Date |
|---|---|---|
| 985,958 | Wetherwald | Mar. 7, 1911 |
| 1,091,160 | Phillips | Mar. 24, 1914 |
| 1,541,712 | Horn | June 9, 1925 |
| 1,927,700 | Dickinson | Sept. 19, 1933 |
| 2,174,292 | Rich | Sept. 26, 1939 |
| 2,237,647 | Williams | Apr. 8, 1941 |
| 2,368,877 | Purvin | Feb. 6, 1945 |
| 2,395,202 | Stevens | Feb. 19, 1946 |

OTHER REFERENCES

Ser. No. 400,817, Mayback (A. P. C.), published May 18, 1943.